US00RE43651E

(19) United States
(12) Reissued Patent
Badyal et al.

(10) Patent Number: US RE43,651 E
(45) Date of Reissued Patent: Sep. 11, 2012

(54) SURFACE COATINGS

(75) Inventors: Jas P. S. Badyal, Wolsingham (GB); Stephen Richard Coulson, Oxfordshire (GB); Colin R. Willis, Andover (GB); Stuart A. Brewer, Fyfield (GB)

(73) Assignee: The Secretary of State for Defence in Her Britannic Majesty's Government of the United Kingdom of Great Britain and Northern Ireland, Farnborough, Hampshire (GB)

(21) Appl. No.: 11/113,340

(22) Filed: Apr. 22, 2005

Related U.S. Patent Documents

Reissue of:

(64) Patent No.: 6,551,950
Issued: Apr. 22, 2003
Appl. No.: 09/445,800
PCT Filed: Jun. 11, 1998
PCT No.: PCT/GB98/01702
§ 371 (c)(1),
(2), (4) Date: Feb. 11, 2000
PCT Pub. No.: WO98/58117
PCT Pub. Date: Dec. 23, 1998

(30) Foreign Application Priority Data

Jun. 14, 1997 (GB) ..... 9712338
Sep. 23, 1997 (GB) ..... 9720078

(51) Int. Cl.

| | |
|---|---|
| ***H05H 1/24*** | (2006.01) |
| *C08F 2/46* | (2006.01) |
| *C08J 7/18* | (2006.01) |
| *H05H 1/00* | (2006.01) |
| *H05H 1/22* | (2006.01) |
| *H05H 1/30* | (2006.01) |
| *H05H 1/46* | (2006.01) |

(52) U.S. Cl. ..... 427/569; 427/487; 427/488; 427/490; 427/491; 427/572; 427/573; 427/575

(58) Field of Classification Search ..... 427/487, 427/488, 490, 491, 492, 508, 513, 569, 572, 427/573, 575; 442/43, 59, 63, 79; 428/102
See application file for complete search history.

(56) References Cited

U.S. PATENT DOCUMENTS 3,102,103 A 8/1963 Albrecht et al.
(Continued)

FOREIGN PATENT DOCUMENTS

EP 0049884 * 4/1982
(Continued)

OTHER PUBLICATIONS

Yasuda et al. J. Polymer Science vol. 15, 1977, 2411-2425 Some Aspects of Plasma Polymerization etc.*

(Continued)

*Primary Examiner* — Kelly M Gambetta
(74) *Attorney, Agent, or Firm* — Dean W. Russell; Tiffany L. Williams; Kilpatrick Townsend & Stockton LLP

(57) ABSTRACT

A method of coating a surface with a polymer layer, which method comprises exposing said surface to a plasma comprising a monomeric unsaturated organic compound which comprises a chain of carbon atoms, which are optionally substituted by halogen; provided that where the compound is a perhalogenated alkene, it has a chain of at least 5 carbon atoms; so as to form an oil or water repellent coating on said substrate. Suitable compounds for use in the methods are compounds of formula (I) where $R^1$, $R^2$ and $R^3$ are independently selected from hydrogen, alkyl, haloalkyl or aryl optionally substituted by halo; provided that at least one of $R^1$, $R^2$ or $R^3$ is hydrogen, and $R^4$ is a group X—$R^5$ where $R^5$ is an alkyl or haloalkyl group and X is a bond; a group of formula —C(O)O$(CH_2)_n$Y— where n is an integer of from 1 to 10 and Y is a bond or a sulphonamide group; or a group —$(O)_pR^6(O)_q(CH_2)_t$— where $R^6$ is aryl optionally substituted by halo, p is 0 or 1, q is 0 or 1 and t is 0 or an integer of from 1 to 10, provided that where q is 1, t is other than 0. The method is particularly useful in the production of oil- and/or water repellent fabrics.

19 Claims, 4 Drawing Sheets

U.S. PATENT DOCUMENTS

| | | | | | |
|---|---|---|---|---|---|
| 3,622,893 | A | | 11/1971 | Dervieux et al. | |
| 4,382,985 | A | | 5/1983 | Hattori et al. | |
| 4,532,150 | A | | 7/1985 | Endo et al. | |
| 4,585,537 | A | | 4/1986 | Nakayama et al. | |
| 4,776,918 | A | | 10/1988 | Otsubo et al. | |
| 4,824,753 | A | * | 4/1989 | Hotomi et al. | 430/111.35 |
| 4,827,870 | A | | 5/1989 | Lee | |
| 4,938,995 | A | * | 7/1990 | Giordano et al. | 427/490 |
| 5,041,304 | A | * | 8/1991 | Kusano et al. | 427/535 |
| 5,089,290 | A | * | 2/1992 | Kleeberg et al. | 427/488 |
| 5,244,730 | A | * | 9/1993 | Nguyen et al. | 428/336 |
| 5,290,378 | A | | 3/1994 | Kusano | |
| 5,298,290 | A | * | 3/1994 | Jost et al. | 427/489 |
| 5,328,576 | A | | 7/1994 | Paskalov et al. | |
| 5,409,777 | A | * | 4/1995 | Kennedy et al. | 428/411.1 |
| 5,622,773 | A | | 4/1997 | Reiner et al. | |
| 5,643,638 | A | * | 7/1997 | Otto et al. | 427/569 |
| 5,662,773 | A | * | 9/1997 | Frederick et al. | 162/4 |
| 5,773,098 | A | * | 6/1998 | Thomas | 427/490 |
| 5,876,753 | A | * | 3/1999 | Timmons et al. | 427/488 |
| 5,888,591 | A | * | 3/1999 | Gleason et al. | 427/522 |
| 6,329,024 | B1 | * | 12/2001 | Timmons et al. | 427/491 |
| 6,663,713 | B1 | | 12/2003 | Robles et al. | |
| 6,793,728 | B1 | | 9/2004 | Davies et al. | |
| 2001/0046146 | A1 | | 11/2001 | Batarseh et al. | |
| 2008/0260965 | A1 | | 10/2008 | Coulson et al. | |

FOREIGN PATENT DOCUMENTS

| | | | | |
|---|---|---|---|---|
| EP | 0 403 915 | | | 12/1990 |
| EP | 0403915 | | * | 12/1990 |
| EP | 0 896 035 | A2 | | 2/1999 |
| EP | 0896035 | A2 | * | 2/1999 |
| GB | 1106071 | | * | 4/1965 |
| GB | 1102903 | | | 2/1968 |
| GB | 1102903 | | | 3/1968 |
| GB | 1530833 | | * | 11/1978 |
| GB | 2105729 | A | | 3/1983 |
| GB | 2 108 133 | | | 5/1983 |
| GB | 2108133 | | * | 5/1983 |
| JP | 57-119906 | | | 7/1982 |
| JP | 206176 | A2 | | 3/1990 |
| JP | 2061176 | A2 | * | 3/1990 |
| SU | 1158-634 | | | 5/1985 |
| WO | 9713024 | | | 4/1997 |
| WO | WO 97/13024 | | | 4/1997 |
| WO | WO97/38801 | | * | 10/1997 |
| WO | WO 97/38801 | | * | 10/1997 |
| WO | 9853117 | | | 12/1998 |
| WO | WO 98/58117 | | | 12/1998 |
| WO | WO 02/28548 | | | 4/2002 |
| WO | 02094906 | A1 | | 11/2002 |
| WO | 03090939 | A1 | | 11/2003 |
| WO | 2004088710 | A2 | | 10/2004 |

OTHER PUBLICATIONS

Wang et al. Chem. Mater. 1996, vol. 8, 2212-2214 Plasma Synthesis of a Novel $CF_3$-Dominated etc.*

U.S. 55,260 P filed Aug. 8, 1997.*

M. Lewin et al., "Handbook of Fibre Science and Technology," Marcel and Dekker, Inc. New York (1984), vol. 2, Part B, Chapter 2, "Repellent Finishes," pp. 143-211.*

Ryan, et al., 'Pulsed Plasma Polymerization of Maleic Anhydride,' *Chem. Mater.,* 8:37-41 (1996).

M. Hynes, et al., 'Plasma Polymerization of Trifluoromethyl-Substituted Perfluorocyclohexane Monomers,' *Macromolecules,* 29 :18-21 (1996).

Database WPI, Week 8505, Derwent Publications Ltd. AN 85-027803, XP002079484 & JP 59 222340 A (NIPQ) Dainippon Printing Co. Ltd.), Dec. 14, 1984.

Limb, et al., "Flexible fluorocarbon wire coatings by pulsed plasma enhanced chemical vapor deposition," *J. Vac. Sci. Technol.,* A 15(4): 1814-1818 (1997).

Office Action dated Sep. 4, 2009 in U.S. Appl. No. 12/332,750.

Response dated Mar. 4, 2010 in U.S. Appl. No. 12/332,750.

Office Action dated May 6, 2010 in U.S. Appl. No. 12/332,750.

Wang, et al., "Plasma Synthesis of a Novel $CF_3$-Dominated Fluorocarbon Film," Chem. Mater., 8:2212-2214 (1996).

Response dated Nov. 5, 2010 in related U.S. Appl. No. 12/332,750.

Response dated Aug. 3, 2010 in related Application No. EP 05007277.6-2124.

Response dated Aug. 5, 2011 in related U.S. Appl. No. 12/332,750.

Office Action dated Feb. 7, 2011 in related U.S. Appl. No. 12/332,750.

Office Action dated Dec. 2, 2011 in U.S. Appl. No. 10/593,207.

Notice of Abandonment dated Mar. 27, 2012 in U.S. Appl. No. 12/332,750.

U.S. Appl. No. 12/332,750, filed Dec. 11, 2008.

Limb et al J. Vac. Sci Technol A 15(4) 1997 pp. 1814-1818 Flexible Flurocarbon wire coatings etc.

* cited by examiner

SURFACE COATINGS

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,551,950. The reissue applications are application Ser. Nos. 11/113,340 (the present application) and 12/332,750, which is a continuation reissue application.*

The present invention relates to the coating of surfaces, in particular to the production of oil- and water-repellent surfaces, as well as to coated articles obtained thereby.

Oil- and water-repellent treatments for a wide variety of surfaces are in widespread use. For example, it may be desirable to impart such properties to solid surfaces, such as metal, glass, ceramics, paper, polymers etc. in order to improve preservation properties, or to prevent or inhibit soiling.

A particular substrate which requires such coatings are fabrics, in particular for outdoor clothing applications, sportswear, leisurewear and in military applications. Their treatments generally require the incorporation of a fluoropolymer into or more particularly, fixed onto the surface of the clothing fabric. The degree of oil and water repellency is a function of the number and length of fluorocarbon groups or moieties that can be fitted into the available space. The greater the concentration of such moieties, the greater the repellency of the finish.

In addition however, the polymeric compounds must be able to form durable bonds with the substrate. Oil- and water-repellent textile treatments are generally based on fluoropolymers that are applied to fabric in the form of an aqueous emulsion. The fabric remains breathable and permeable to air since the treatment simply coats the fibres with a very thin, liquid-repellent film. In order to make these finishes durable, they are sometimes co-applied with cross-linking resins that hind the fluoropolymer treatment to fibres. Whilst good levels of durability towards laundering and dry-cleaning can be achieved in this way, the cross-linking resins can seriously damage cellulosic fibres and reduce the mechanical strength of the material. Chemical methods for producing oil- and water-repellent textiles are disclosed for example in WO 97/13024 and British patent No 1,102,903 or M. Lewin et al., 'Handbood of Fibre Science and Technology' Marcel and Dekker Inc., New York, (1984) Vol 2, Part B Chapter 2.

Plasma deposition techniques have been quite widely used for the deposition of polymeric coatings onto a range of surfaces. This technique is recognised as being a clean, dry technique that generates little waste compared to conventional wet chemical methods. Using this method, plasmas are generated from small organic molecules, which are subjected to an ionising electrical field under low pressure conditions. When this is done in the presence of a substrate, the ions, radicals and excited molecules of the compound in the plasma polymerise in the gas phase and react with a growing polymer film on the substrate. Conventional polymer synthesis tends to produce structures containing repeat units which bear a strong resemblance to the monomer species, whereas a polymer network generated using a plasma can be extremely complex.

The success or otherwise of plasma polymerisation depends upon a number of factors, including the nature of the organic compound. Reactive oxygen containing compounds such as maleic anhydride, has previously been subjected to plasma polymerisation (Chem. Mater. Vol. 8, 1, 1996).

U.S. Pat. No. 5,328,576 describes the treatment of fabric or paper surfaces to impart liquid repellent properties by subjecting the surfaces to a pre-treatment with an oxygen plasma, followed by plasma polymerisation of methane.

However, plasma polymerisation of the desirable oil and water repellent fluorocarbons have proved more difficult to achieve. It has been reported that cyclic fluorocarbons undergo plasma polymerisation more readily than their acyclic counterparts (H. Yasuda et al., J. Polym. Sci., Polym. Chem. Ed. 1977, 15, 2411). The plasma polymerization of trifluoromethyl-substituted perfluorocyclohexane mono- has been reported (A. M. Hynes et al., Macromolecules, 1996, 29, 18-21).

A process in which textiles are subjected to plasma discharge in the presence of an inert gas and subsequently exposed to an F-containing acrylic monomer is described in SU-1158-634. A similar process for the deposition of a fluroalkyl acrylate resists on a solid substrate is described in European Patent Application No. 0049884.

Japanese application no. 816773 describes the plasma polymerisation of compounds including fluorosubstituted acrylates. In that process, a mixture of the fluorosubstituted acrylate compounds and an inert gas are subjected to a glow discharge.

The applicants have found an improved method of producing polymer and particular halopolymer coatings which are water and/or oil repellent on surfaces.

According to the present invention there is provided a method of coating a surface with a polymer layer, which method comprises exposing said surface to a plasma comprising a monomeric unsaturated organic compound which comprises an optionally substituted hydrocarbon group, wherein the optional substituents are halogen; provided that where the compound is a straight chain perhalogenated alkene, it includes at least 5 carbon atoms; so as to form an oil or water repellent coating on said substrate.

Unsaturated organic compounds are those which contain at least one double bond which is capable of reacting to form a polymeric compound. The compounds used in the method of the invention suitably include at least one optionally substituted hydrocarbon chain. Suitable chains, which may be straight or branched, have from 3 to 20 carbon atoms, more suitably from 6 to 12 carbon atoms Monomeric compounds used in the method may include the double bond within a chain and so comprise alkenyl compounds. Alternatively, the compounds may comprise an alkyl chain, optionally substituted by halogen, as a substitutent which is attached to an unsaturated moiety either directly or by way of an functional group, such as a ester or sulphonamide group.

As used therein the term "halo" or "halogen" refers to fluorine, chlorine, bromine and iodine. Particularly preferred halo groups are fluoro. The term hydrocarbon includes to alkyl, alkenyl or aryl groups. The term "aryl" refers to aromatic cyclic groups such as phenyl or napthyl, in particular phenyl. The term "alkyl" refers to straight or branched chains of carbon atoms, suitably of up to 20 carbon atoms in length. The term "alkenyl" refers to straight or branched unsaturated chains suitably having from 2 to 20 carbon atoms.

Monomeric compounds where the chains comprise unsubstituted alkyl or alkenyl groups are suitable for producing coatings which are water repellent. By substituting at least some of the hydrogen atoms in these chains with at least some halogen atoms, oil repellency may also be conferred by the coating.

Thus in a preferred aspect, the monomeric compounds include haloalkyl moieties or comprise haloalkenyls. Therefore, preferably the plasma used in the method of the invention will comprise a monomeric unsaturated haloalkyl containing organic compound.

Suitable plasmas for use in the method of the invention include non-equilibrium plasmas such as those generated by radiofrequencies (Rf), microwaves or direct current (DC). They may operate at atmospheric or sub-atmospheric pressures as are known in the art.

The plasma may comprise the monomeric compound alone, in the absence of other gases or in mixture with for example an inert gas. Plasmas consisting of monomeric compound alone may be achieved as illustrated hereinafter, by first evacuating the reactor vessel as far as possible, and then purging the reactor vessel with the organic compound for a period sufficient to ensure that the vessel is substantially free of other gases.

Particularly suitable monomeric organic compounds are those of formula (I)

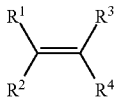

(I)

where $R^1$, $R^2$ and $R^3$ are independently selected from hydrogen, alkyl, haloalkyl or aryl optionally substituted by halo; and $R^4$ is a group X—$R^5$ where $R^5$ is an alkyl or haloalkyl group and X is a bond; a group of formula —C(O)O$(CH_2)_n$Y— where n is an integer of from 1 to 10 and Y is a bond or a sulphonamide group; or a group —$(O)_pR^6(O)_q(CH_2)_t$— where $R^6$ is aryl optionally substituted by halo, p is 0 or 1, q is 0 or 1 and t is 0 or an integer of from 1 to 10, provided that where q is 1, t is other than 0.

Suitable haloalkyl groups for $R^1$, $R^2$, $R^3$ and $R^5$ are fluoroalkyl groups. The alkyl chains may be straight or branched and may include cyclic moieties.

For $R^5$, the alkyl chains suitably comprise 2 or more carbon atoms, suitably from 2-20 carbon atoms and preferably from 6 to 12 carbon atoms.

For $R^1$, $R^2$ and $R^3$, alkyl chains are generally preferred to have from 1 to 6 carbon atoms.

Preferably $R^5$ is a haloalkyl, and more preferably a perhaloalkyl group, particularly a perfluoroalkyl group of formula $C_mF_{2m+1}$ where m is an integer of 1 or more, suitably from 1-20, and preferably from 6-12 such as 8 or 10.

Suitable alkyl groups for $R^1$, $R^2$ and $R^3$ have from 1 to 6 carbon atoms.

Preferably however, at least one of $R^1$, $R^2$ and $R^3$ is hydrogen and preferably $R^1$, $R^2$, $R^3$ are all hydrogen.

Where X is a group —C(O)O$(CH_2)_n$Y—, n is an integer which provides a suitable spacer group. In particular, n is from 1 to 5, preferably about 2.

Suitable sulphonamide groups for Y include those of formula —N($R^7$)$SO_2$ where $R^7$ is hydrogen or alkyl such as $C_{1-4}$alkyl, in particular methyl or ethyl.

In a preferred embodiment, the compound of formula (I) is a compound of formula (II)

$$CH_2{=}CH{-}R^5 \quad \text{(II)}$$

where $R^5$ is as defined above in relation to formula (I).

In compounds of formula (II), X in formula (I) is a bond.

In an alternative preferred embodiment, the compound of formula (I) is an acrylate of formula (III)

$$CH_2{=}CR^7C(O)O(CH_2)_nR^5$$

where n and $R^5$ as defined above in relation to formula (I) and $R^7$ is hydrogen or $C_{1-6}$ alkyl, such as methyl.

Using these compounds, coatings with water hydrophobicity values of up to 10 and oleophobicity values of up to 8 have been achieved as illustrated hereinafter.

Other compounds of formula (I) are styrene derivatives as are well known in the polymer art.

All compounds of formula (I) are either known compounds or they can be prepared from known compounds using conventional methods.

The surface coated in accordance with the invention may be of any solid substrate, such as fabric, metal, glass, ceramics, paper or polymers. In particular, the surface comprises a fabric substrate such as a cellulosic fabric, to which oil- and/or water-repellency is to be applied. Alternatatively, the fabric may be a synthetic fabric such as an acrylic/nylon fabric.

The fabric may be untreated or it may have been subjected to earlier treatments. For example, it has been found that treatment in accordance with the invention can enhance the water repellency and confer a good oil-repellent finish onto fabric which already has a silicone finish which is water repellent only.

Precise conditions under which the plasma polymerization takes place in an effective manner will vary depending upon factors such as the nature of the polymer, the substrate etc. and will be determined using routine methods and/or the techniques illustrated hereinafter. In general however, polymerisation is suitably effected using vapours of compounds of formula (I) at pressures of from 0.01 to 10 mbar, suitably at about 0.2 mbar.

A glow discharge is then ignited by applying a high frequency voltage, for example at 13.56 MHz.

The applied fields are suitably of average power of up to 50 W. Suitable conditions include pulsed or continuous fields, but are preferably pulsed fields. The pulses are applied in a sequence which yields very low average powers, for example of less than 10 W and preferably of less than 1 W. Examples of such sequences are those in which the power is on for 20 μs and off for from 10000 μs to 20000 μs.

The fields are suitably applied for a period sufficient to give the desired coating. In general, this will be from 30 seconds to 20 minutes, preferably from 2 to 15 minutes, depending upon the nature of the compound of formula (I) and the substrate etc.

Plasma polymerisation of compounds of formula (I), particularly at low average powers has been found to result in the deposition of highly fluorinated coatings which exhibit superhydrophobicity. In addition, a high level of structural retention of the compound of formula (I) occurs in the coating layer, which may be attributed to the direct polymerisation of the alkene monomer for instance a fluoroalkene monomer via its highly susceptible double bond.

It has been noted, particularly in the case of the polymerisation of compounds of formula (III) above, that low power pulsed plasma polymerisation produces well-adhered coatings which exhibit excellent water and oil repellency. The greater level of structural retention in the case of pulsed plasma polymerisation can be attributed to free radical polymerisation occurring during the duty cycle off-time and less fragmentation during the on-time.

In a particularly preferred embodiment of the invention, a surface is exposing a surface to a plasma comprising a compound of formula (III) as defined above, wherein the plasma being created by a pulsed voltage also as described above.

Suitably the compound of formula (I) includes a perfluoroalkylated tail or moiety, the process of the invention may have oleophobic as well as hydrophobic surface properties.

Thus the invention further provides a hydrophobic or oleophobic substrate which comprises a substrate comprising a coating of a alkyl polymer and particularly a haloalkyl polymer which has been applied by the method described above. In particular, the substrates are fabrics but they may be solid materials such as biomedical devices.

The invention will now be particularly described by way of example with reference to the accompanying diagrammatic drawings in which.

EXAMPLE 1

Figure 1:
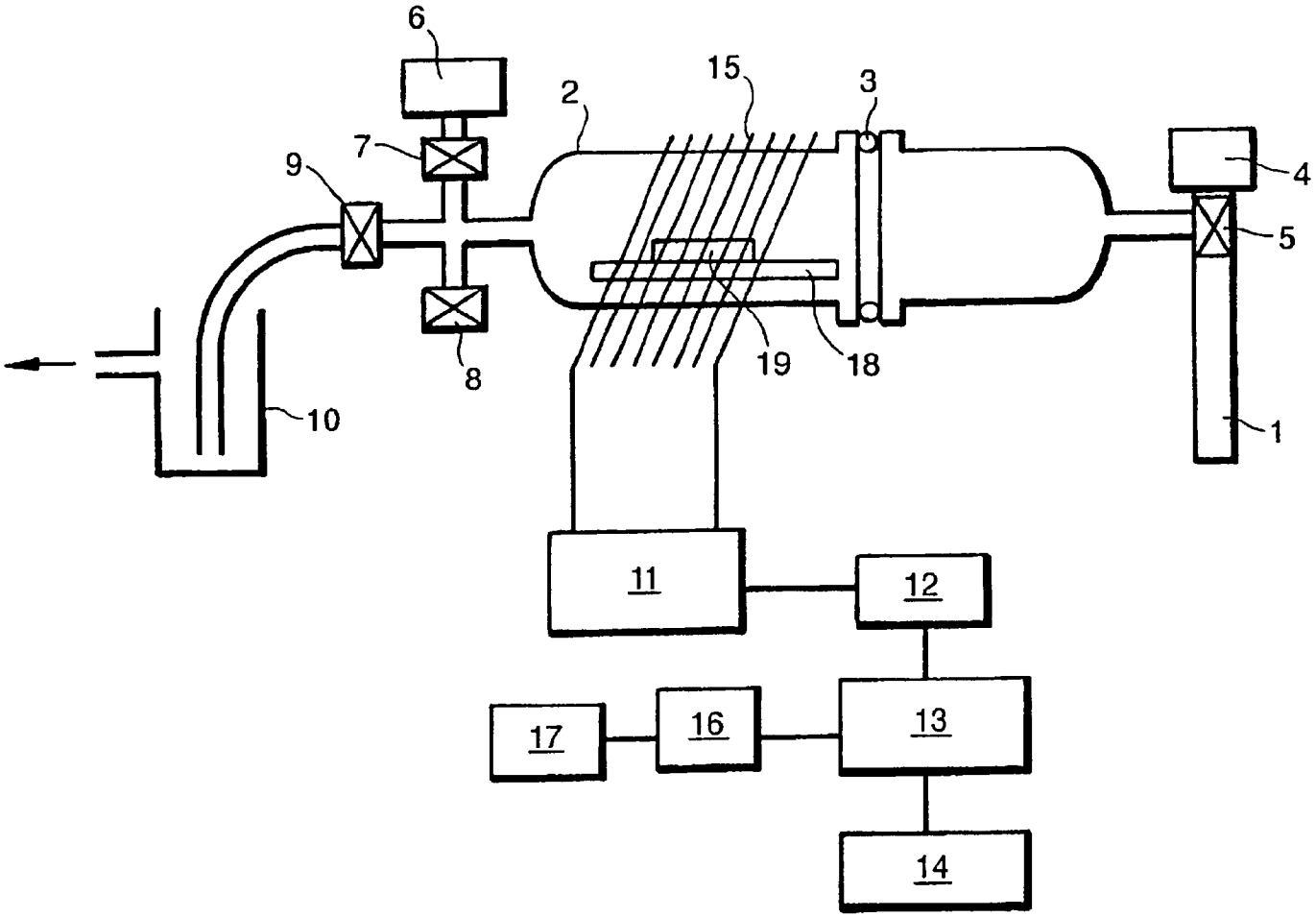
FIG. 1 shows a diagram of the apparatus used to effect plasma deposition.

Plasma Polymerisation of Alkene 1H, 1H, 2H-perfluoro-1-dodecene ($C_{10}F_{21}CH{=}CH_2$) (Fluorochem F06003, 97% purity) was placed into a monomer tube (I) (FIG. 1) and further purified using freeze-thaw cycles. A series of plasma polymerisation experiments were carried out in an inductively coupled cylindrical plasma reactor vessel (2) of 5 cm diameter, 470 $cm^3$ volume, base pressure of $7\times10^{-3}$ mbar, and with a leak rate of better than $2\times10^{-3}$ $cm^3min^{-1}$. The reactor vessel (2) was connected by way of a "viton" O-ring (3), a gas inlet (4) and a needle valve (5) to the monomer tube (1).

A thermocouple pressure gauge (6) was connected by way of a Young's tap (7) to the reactor vessel (2). A further Young's tap (8) connected with an air supply and a third (9) lead to an E2M2 two stage Edwards rotary pump (not shown) by way of a liquid nitrogen cold trap (10). All connections were grease free.

An L-C matching unit (11) and a power meter (12) was used to couple the output of a 13.56 Mhz R.F. generator (13), which was connected to a power supply (14), to copper coils (15) surrounding the reactor vessel (2). This arrangement ensured that the standing wave ratio (SWR) of the transmitted power to partially ionised gas in the reactor vessel (2) could be minimised. For pulsed plasma deposition, a pulsed signal generator (16) was used to trigger the R.F power supply, and a cathode ray oscilloscope (17) was used to monitor the pulse width and amplitude. The average power <P> delivered to the system during pulsing is given by the following formula:

$$\langle P\rangle = P_{cw}\{T_{on}/(T_{on}+T_{off})\}$$

where $T_{on}/(T_{on}+T_{off})$ is defined as the duty cycle and $P_{cw}$ is the average continuous wave power.

In order to carry out polymerization/deposition reactions the reactor vessel (2) was cleaned by soaking overnight in a chloros bleach bath, then scrubbing with detergent and finally rinsing with isopropyl alcohol followed by oven drying. The reactor vessel (2) was then incorporated into the assembly as shown in FIG. 1 and further cleaned with a 50 W air plasma for 30 minutes. Next the reactor (2) vessel was vented to air and the substrate to be coated (19), in this case a glass slide, was placed in the centre of the chamber defined by the reactor vessel (2) on a glass plate (18). The chamber was then evacuated back down to base pressure ($7.2\times10^{-3}$ mbar).

Perfluoroalkene vapour was then introduced into the reaction chamber at a constant pressure of ~0.2 mbar and allowed to purge the plasma reactor, followed by ignition of the glow discharge. Typically 2-15 minutes deposition time was found to be sufficient to give complete coverage of the substrate. After this, the R.F generator was switched off and the perfluoroalkene vapour allowed to continue to pass over the substrate for a further 5 minutes before evacuating the reactor back down to base pressure, and finally venting up to atmospheric pressure.

The deposited plasma polymer coatings were characterised immediately after deposition by X-ray photoelectron spectroscopy (XPS). Complete plasma polymer coverage was confirmed by the absence of any Si (2p) XPS signals showing through from the underlying glass substrate.

A control experiment, where the fluoroalkene vapour was allowed to pass over the substrate for 15 minutes and then pumped down to base pressure was found to show the presence of a large Si (2p) XPS signal from the substrate. Hence the coatings obtained during plasma polymerisation are not just due to absorption of the fluoroalkene monomer onto the substrate.

Figure 2:
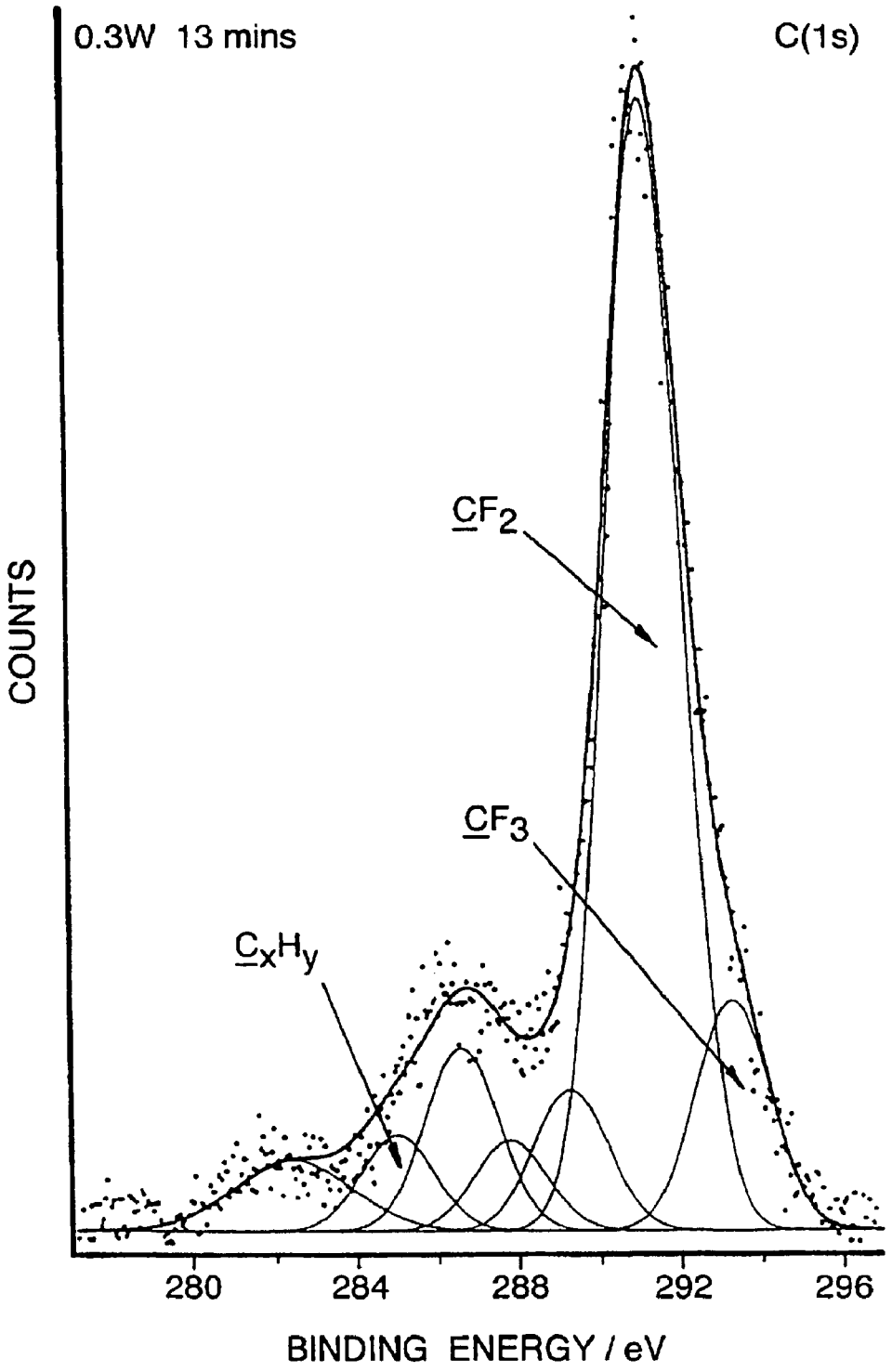
FIG. 2 is a graph showing the characteristics of continuous wave plasma polymerisation of 1H, 1H, 2H-pefluoro-1-dodecene.

The experiments were carried out with average powers in the range of from 0.3 to 50 W. The results of the XPS spectrum of a 0.3 W continuous wave plasma polymer deposition onto a glass slide for 13 minutes is shown in FIG. 2.

It can be seen that in this instance, $CF_2$ and $CF_3$ groups are the prominent environments in the C (1s) XPS envelope:

$CF_2$ (291.2 eV) 61%

$CF_3$ (293.3 ev) 12%

The remaining carbon environments comprised partially fluorinated carbon centres and a small amount of hydrocarbon ($C_xH_y$). The experimental and theoretically expected (taken from the monomer) values are given in Table 1

TABLE 1

| | Experimental | Theoretical |
|---|---|---|
| F:C ratio | 1.70 ± 0.3 | 1.75 |
| % $\underline{C}F_2$ group | 61% ± 2% | 75% |
| % $\underline{C}F_3$ group | 12% ± 2% | 8% |

The difference between theoretical and experimental $CF_2$ group and $CF_3$ group percentages can be attributed to a small amount of fragmentation of the perfluoroalkene monomer.

Figure 3:
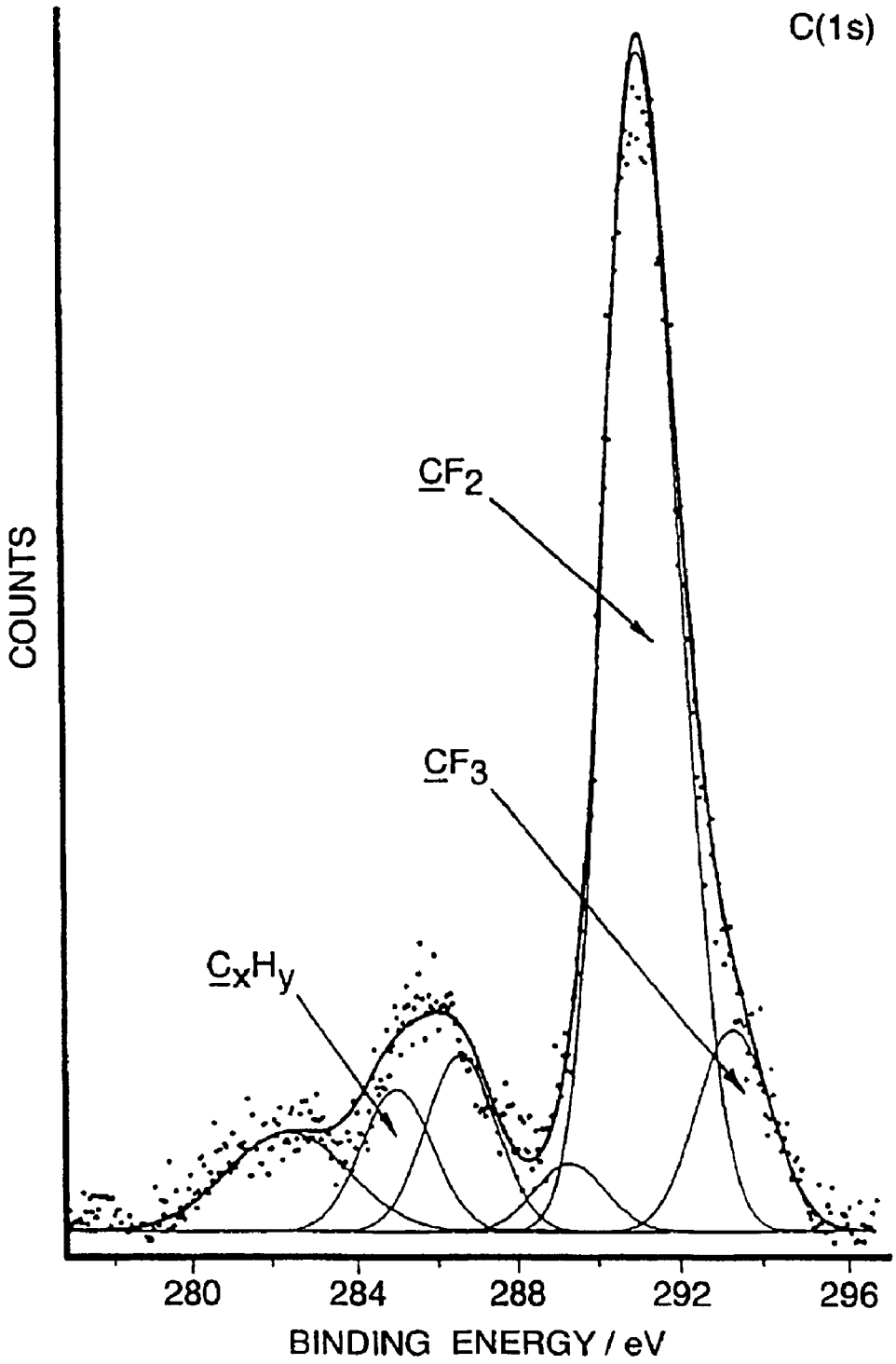
FIG. 3 is a graph showing the characteristics of pulsed plasma polymerisation of 1H, 1H, 2H-pefluoro-1-dodecene at 50 W $P_P$, $T_{on}$=20 μs and $T_{off}$=10000 μs for 5 minutes.

FIG. 3 shows the C (1s) XPS spectrum for a 5 minute pulsed plasma polymerisation experiment where:

$P_{cw}$=50 W $T_{on}$=20 μs $T_{off}$=1000 μs <P>=0.1 W

The chemical composition of the deposited coating for pulsed plasma deposition is given in Table 2 below.

TABLE 2

| | Experimental | Theoretical |
|---|---|---|
| F:C ratio | 1.75 ± 0.7 | 1.75 |
| % $\underline{C}F_2$ group | 63% ± 2% | 75% |
| % $\underline{C}F_3$ group | 10% ± 2% | 8% |

It can be seen that the $CF_2$ region is better resolved and has greater intensity which means less fragmentation of the perfluoroalkyl tail compared to continuous wave plasma polymerisation.

Surface energy measurements were carried out on slides produced in this way using dynamic contact angle analysis. The results showed that the surface energy was in the range of 5-6 $mJm^{-1}$.

EXAMPLE 2

Oil and Water Repellency Test

The pulsed plasma deposition conditions described in Example 1 above were used to coat a piece of cotton (3×8 cm) which was then tested for wettability using "3M Test Methods" (3M oil repellency Test 1, 3M Test Methods Oct. 1, 1988). As a Water repellency test, the 3M water repellency Test II, water/alcohol drop test, 3M Test 1, 3M Test Methods, Oct. 1, 1988 was used. These tests are designed to detect a fluorochemical finish on all types of fabrics by measuring:

(a) aqueous stain resistance using mixtures of water and isopropyl alcohol.

(b) the fabric's resistance to wetting by a selected series of hydrocarbon liquids of different surface tensions.

These tests are not intended to give an absolute measure of the fabric's resistance to staining by watery or oily materials, since other factors such as fabric construction, fibre type, dyes, other finishing agents, etc., also influence stain resistance. These tests can, however, be used to compare various finishes. The water repellency tests comprises placing 3 drops of a standard test liquid consisting of specified proportions of water and isopropyl alcohol by volume onto the plasma polymerised surface. The surface is considered to repel this liquid if after 10 seconds, 2 of the 3 drops do not wet the fabric. From this, the water repellency rating is taken as being the test liquid with the greater proportion of isopropyl alcohol which passes the test. In the case of the oil repellency test, 3 drops of hydrocarbon liquid are placed on the coated surface. If after 30 seconds no penetration or wetting of the fabric at the liquid-fabric interface occurs around 2 of the 3 drops is evident, then the test is passed.

The oil repellency rating is taken to be the highest-numbered test liquid which does not wet the fabric surface (where the increasing number corresponds to decreasing hydrocarbon chain and surface tension).

The ratings obtained for the pulsed plasma deposition of 1H, 1H, 2H perfluoro-1-dodecene onto cellulose were:

Water 9 (10% water, 90% isopropyl alcohol)

Oil 5 (dodecane)

These values compare well with commercial treatments.

EXAMPLE 3

Plasma Polymerisation of Acrylates

Figure 4:
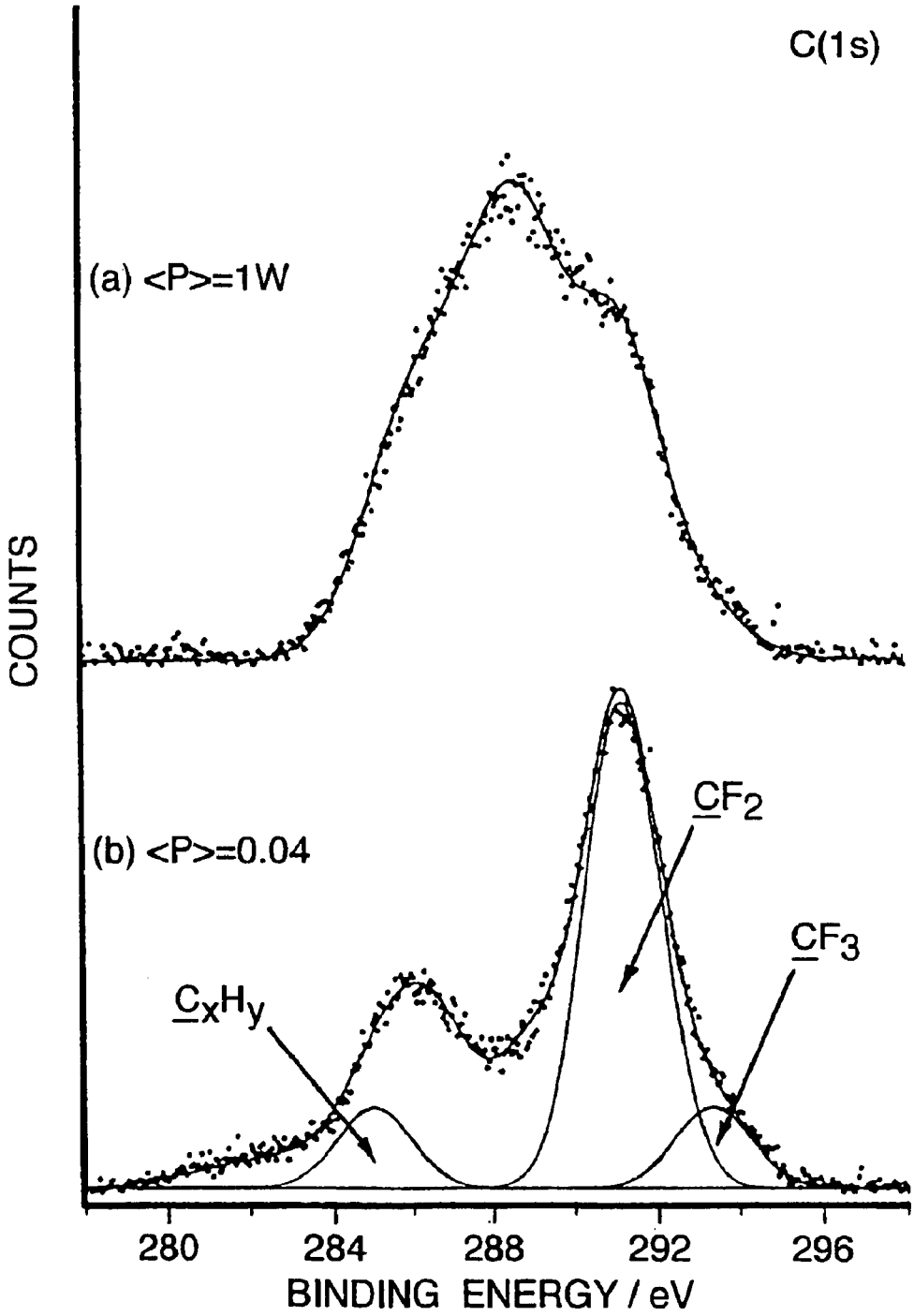
FIG. 4 is a graph showing the characteristics of (a) continuous and (b) pulsed plasma polymerisation of 1H, 1H, 2H, 2H-heptadecafluorodecyl acrylate.

The method of Example 1 described above was repeated using 1H, 1H, 2H, 2H-heptadecafluorodecyl acrylate (Fluorochem F04389E, 98% purity) in place of the perfluoroalkene. As in Example 1, low average powers were used for continuous wave and pulsed plasma polymerisation experiments. For example, the XPS spectrum of a 1 W continuous wave plasma polymer deposited onto a glass slide for 10 minutes is shown in FIG. 4(a). FIG. 4(b) shows the C(1s) XPS spectrum for a 10 minutes pulsed plasma polymerisation experiment where $P_{cs}$=40 W (average continuous wave power)

$T_{on}$=20 μs (pulsed time on)

$T_{off}$=20000 μs (pulsed time off)

<P>=0.04 W (average pulsed power)

Table 3 compares the theoretical (taken from the monomer, $CH_2{=}CHCO_2CH_2CH_2C_8F_{17}$) environments with what is actually found for polymer coatings.

TABLE 3

| Environment | eV | Theoretical percentages | Experimental percentages |
|---|---|---|---|
| $\underline{C}F_3$ | 293.2 | 7.7 | 7.8 |
| $\underline{C}F_3$ | 291.2 | 53.8 | 47.0 |
| O—$\underline{C}$=O | 289.0 | 7.7 | 13.0 |
| $\underline{C}$F | 287.8 | — | 0.7 |
| $\underline{C}$—$CF_n$/C—O | 286.6 | 15.4 | 13.4 |
| $\underline{C}$—C(O)=O | 285.7 | 7.7 | 3.9 |
| $\underline{C}_xC_y$ | 285.0 | 7.7 | 7.2 |

It can be seen that the $CF_2$ group is the prominent environment in the C(1s) XPS envelope at 291.2 eV. The remaining carbon environments being $CF_3$, partially fluorinated and oxygenated carbon centres and a small amount of hydrocarbon ($C_xH_y$). The chemical composition of the coatings deposited for continuous wave and pulsed plasma conditions are given below in Table 4 (excluding satellite percentages) along with the theoretically expected compositions).

TABLE 4

| | Theoretical | CW Plasma | Pulsed Plasma |
|---|---|---|---|
| F:C ratio | 1.31 | 0.94 | 1.49 |
| % $\underline{C}F_2$ group | 53.8% | 27.2% | 47.0% |
| % $\underline{C}F_3$ group | 7.7% | 3.8% | 7.8% |

It can be seen from FIG. 4(b) that the $CF_2$ region is better resolved and has greater intensity, which means less fragmentation of the perfluoroalkyl tail occurs during pulsed plasma conditions compared to continuous wave plasma polymerisation. In the case of the continuous wave plasma experiments, the low percentages of $CF_2$ and $CF_3$ groups occur.

Surface energy measurements as described in Example 1 shows a surface energy of 6 $mJm^{-1}$.

EXAMPLE 4

Oil and Water Repellency Test

Using the pulsed plasma deposition conditions of Example 3 except that these were applied for 15 minutes, pieces of cotton (3-8 cm) were coated with 1H, 1H, 2H, 2H-heptadecafluorodecyl acrylate. Similar pieces of cotton were coated with the same compound using a continuous wave at 1 W fo 15 minutes. These were then subjected to oil and water repellency tests as described in Example 2 above.

Samples were then subjected to a benzotrifluoride Soxhlet extraction for either 1 or 7 hours and the oil and water repellency tests repeated. The results, expressed as described in Example 2,

| | Continuous wave | | Pulsed wave | |
|---|---|---|---|---|
| Time (hours) | Oil-repellency | Water repellency | Oil repellency | Water repellency |
| 0 | 7 | 4 | 8 | 10 |
| 1 | — | 2 | 6 | 7 |
| 7 | — | 2 | 5 | 7 |

Hence these coatings are highly hydrophobic and oleophobic and the coatings have good durability.

EXAMPLE 5

Treatment of Silicone Coated Synthetic Fabric

A sample of a modifed acrylic/nylon fabric which already contained a silicone coating to impart water repellency, was subjected to the a pulsed acrylate plasma consisting of the compound $CH_2{=}CHCOO(CH_2)_2C_8F_{17}$ and using the conditions described in Example 3.

A sample of the same material was subjected to a two stage deposition process in which the fabric was first exposed to a continuous wave 30 W air plasma for 5 seconds followed by exposure to the same acrylate vapour only. The products were then tested for oil and water repellency as described in Example 2.

In addition, the durability of the coating was tested by then subjecting the products to a 1 hour Soxhlet extraction with trichloroethylene.

The results are as shown in Table 5

TABLE 5

| | Repellency Ratings | | |
|---|---|---|---|
| Treatment | Before Plasma | After Plasma | After extraction with solvent |
| Pulsed phase acrylate plasma | W2 | O7, W10 | O6 W8 |
| Air plasma followed by exposure to acylate monomer | W2 | O1, W3 | O1 (borderline) W2 |

It appears therefore that the process of the invention can not only enhance the water repellency of such as fabric, and also confer oil repellency, the durability of the coating is higher than that obtained using the known two step grafting polymerisation process.

What is claimed is:

[1. A method of coating a surface with a polymer layer, which method comprises exposing said surface to a pulsed plasma comprising a compound of formula (I)

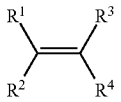

(I)

where $R^1$, $R^2$ and $R^3$ are independently selected from hydrogen, alkyl, haloalkyl or aryl optionally substituted by halo, provided that at least one of $R^1$, $R^2$ and $R^3$ is hydrogen, and $R^4$ is a group X—$R^5$, where $R^5$ is an alkyl or haloalkyl group, and X is:

a bond; or a group of formula —$C(O)O(CH_2)_nY$— where n is an integer of from 1 to 10 and Y is a bond or a sulphonamide group; or a group —$(O)_pR^6(O)_q(CH2)_t$— where $R^6$ is aryl optionally substituted by halo, p is 0 or 1, q is 0 or 1 and t is 0 or an integer of from 1 to 10, provided that where q is 1, t is other than 0;

so as to form an oil and/or water repellent coating on said surface.]

[2. A method according to claim 1 wherein $R^5$ is a haloalkyl group.]

[3. A method according to claim 2 wherein $R^5$ is a perhaloalkyl group.]

[4. A method according to claim 3 wherein $R^5$ is a perfluoroalkyl group of formula $C_mF_{2m+1}$ where m is an integer of 1 or more.]

[5. A method according to claim 4 wherein m is from 1-20.]

[6. A method according to claim 5 wherein m is from 6-12.]

[7. A method according to claim 1 wherein $R^1$, $R^2$ and $R^3$ are independently selected from hydrogen or a $C_{1-6}$ alkyl or halo-$C_{1-6}$alkyl group, provided that at least one of $R^1$, $R^2$ and $R^3$ is hydrogen.]

[8. A method according to claim 7 wherein $R^1$, $R^2$ and $R^3$ are all hydrogen.]

[9. A method according to claim 1 wherein X is a group of formula —$C(O)O(CH_2)_nY$— and Y is a sulphonamide group of formula —$N(R^6)SO_2$— where $R^6$ is hydrogen or alkyl.]

[10. A method according to claim 3 wherein the compound of formula (I) comprises a compound of formula (II)

$$CH_2{=}CH{-}R^5 \quad \text{(II)}$$

where $R^5$ is as defined in claim 1.]

[11. A method according to claim 1 wherein the compound of formula (I) is an acrylate of formula (III)

$$CH_2{=}CR^7C(O)O(CH_2)_nR^5 \quad \text{(III)}$$

where n and $R^5$ are defined in claim 1 and $R^7$ is hydrogen or $C_{1-6}$ alkyl.]

[12. A method according to claim 1 wherein the surface is a surface of a fabric, metal, glass, ceramics, paper or polymer substrate.]

[13. A method according to claim 12 wherein the substrate is a fabric.]

[14. A method according to claim 1 wherein the gas pressure of the compound of formula (I) is from 0.01 to 10 mbar.]

[15. A method according to claim 1 wherein a glow discharge is ignited by applying a high frequency voltage.]

[16. A method according to claim 15 wherein pulses are applied in a sequence which yields low average power.]

[17. A method according to claim 16 wherein the average power density is equivalent to less than 10 W in a volume of 470 $cm^3$.]

[18. A method according to either of claim 16 wherein the average power density is equivalent to less than 1 W in a volume of 470 $cm^3$.]

[19. A method according to claim 15 wherein the sequence comprises a duty cycle (the ratio of time for which the power is on to the time for which the power is off) of between 1:500 and 1:1000. ]

[20. A hydrophobic and/or oleophobic substrate which comprises a coating of a polymer which has been applied by the method according to claim 1.]

[21. A hydrophobic and/or oleophobic substrate according to claim 20 wherein the polymer is a haloalkyl polymer.]

[22. A substrate according to claim 20 which is a fabric.]

[23. An item of clothing which comprises a fabric according to claim 22.]

[24. A method of coating a surface with a polymer layer, which method comprises exposing said surface to a plasma comprising a monomeric unsaturated organic compound which comprises an optionally substituted hydrocarbon group wherein any optional substituents are halogen; provided that where the compound is a straight chain perhalogenated alkene, it comprises at least 5 carbon atoms, wherein the plasma is pulsed so as to provide a low average power, further wherein the average power density is equivalent to less than 1 W in a volume of 470 $cm^3$.]

[25. A hydrophobic and/or oleophobic substrate which comprises a coating of a polymer which has been applied by the method according to claim 24.]

[26. A substrate having a coating thereon, said coating being deposited by pulsed plasma deposition and being derived from a compound of formula (I)

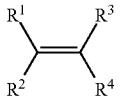

(I)

where $R^1$, $R^2$ and $R^3$ are independently selected from hydrogen, alkyl, haloalkyl or aryl optionally substituted by halo, provided that at least one of $R^1$, $R^2$ and $R^3$ is hydrogen, and $R^4$ is a group X—$R^5$, where $R^5$ is an alkyl or haloalkyl group, and X is:

a bond; or a group of formula —C(O)O$(CH_2)_n$Y— where n is an integer of from 1 to 10 and Y is a bond or a sulphonamide group; or a group —$(O)_pR^6(O)_q(CH2)_t$— where $R^6$ is aryl optionally substituted by halo, p is 0 or 1, q is 0 or 1 and t is 0 or an integer of from 1 to 10, provided that where q is 1, t is other than 0, the compound of formula (I) having been treated such that the double bond reacts to form the coating but otherwise, the structure of the monomer is substantially retained, and wherein the coating is such that were it present on a planar glass surface, it would have a surface energy of 5-6 $mNm^{-1}$.]

*27. A method of coating a surface with a polymer layer, which method comprises exposing said surface to a pulsed plasma comprising a compound of formula (I)*

$$R^1R^2C{=}CR^3R^4 \quad (I)$$

*where $R^1$, $R^2$ and $R^3$ are independently selected from hydrogen, alkyl, haloalkyl or aryl optionally substituted by halo, provided that at least one of $R^1$, $R^2$ and $R^3$ is hydrogen, and $R^4$ is a group X—$R^5$, where $R^5$ is a perhaloalkyl group having from 6 to 20 carbon atoms and X is:*

*a bond; or a group of formula —C—(O)O$(CH_2)_n$Y— where n is an integer of from 1 to 10 and Y is a bond or a sulphonamide group; or*

*a group —$(O)_pR^6(O)_q(CH_2)_t$— where $R^6$ is aryl optionally substituted by halo, p is 0 or 1, q is 0 or 1 and t is 0 or an integer of from 1 to 10, provided that where q is 1, t is other than 0;*

*wherein a glow discharge is ignited by applying a high frequency voltage and wherein pulses are applied in a sequence which yields an average power density equivalent to less than 50 W in a volume of 470 $cm^3$ so as to form an oil and water repellent coating on said surface.*

*28. A method according to claim 27, wherein $R^5$ is a perfluoroalkyl group of formula $C_mF_{2m+1}$ where m is an integer from 6 to 12.*

*29. A method according to claim 27, wherein the coating is such that were it present on a planar glass surface, it would have a surface energy of 5-6 $mJm^{-1}$.*

*30. A method according to claim 27, wherein the average power density is equivalent to less than 1 W in a volume of 470 $cm^3$.*

*31. A hydrophobic and oleophobic substrate which comprises a polymer coated surface obtained by the method of claim 27.*

*32. A method of coating a surface with an oil and water repellent polymer layer, which method comprises exposing said surface to a pulsed plasma comprising a compound of formula (II)*

$$CH_2{=}CHR^5 \quad (II)$$

*where $R^5$ is a $C_{6-20}$ perhaloalkyl group of formula $C_mF_{2m+1}$ where m is an integer from 6 to 20, in which a glow discharge is ignited by applying a high frequency voltage, and in which the high frequency voltage is applied as a pulsed field, in which pulses are applied in a sequence which yields an average power density equivalent to less than 50 W in a volume of 470 $cm^3$ so as to form an oil and water repellent coating on said surface.*

*33. A method according to claim 32, wherein the coating is such that were it present on a planar glass surface, it would have a surface energy of 5-6 $mJm^{-1}$.*

*34. A method according to claim 32, wherein the average power density is equivalent to less than 1 W in a volume of 470 $cm^3$.*

*35. A method according to claim 32, in which the sequence is such that the power is on for 20 μs and off for from 10,000 μs to 20,000 μs.*

*36. A hydrophobic and oleophobic substrate which comprises a polymer coated surface obtained by the method of claim 32.*

*37. A substrate according to claim 36, which is a fabric.*

*38. A method according to claim 32, wherein $R^5$ is a perfluoroalkyl group of formula $C_mF_{2m+1}$ where m is an integer from 6 to 12.*

*39. A method of coating a surface with an oil and water repellent polymer layer, which method comprises exposing said surface to a pulsed plasma comprising a compound of formula (III)*

$$CH_2{=}CR^7C(O)O(CH_2)_nR^5 \quad (III)$$

*where $R^7$ is hydrogen or $C_{1-6}$ alkyl, n is an integer of from 1 to 10 and where $R^5$ is a perfluoroalkyl group having from 6 to 20 carbon atoms,*

*in which a glow discharge is ignited by applying a high frequency voltage, and in which the high frequency voltage is applied as a pulsed field, in which pulses are applied in a sequence which yields an average power density equivalent to less than 50 W in a volume of 470 $cm^3$ so as to form an oil and water repellent coating on said surface.*

*40. A method according to claim 39, wherein the coating is such that were it present on a planar glass surface, it would have a surface energy of 5-6 $mJm^{-1}$.*

*41. A method according to claim 39, wherein $R^5$ is a perfluoroalkyl group of formula $C_mF_{2m+1}$ where m is an integer from 6 to 12.*

*42. A method according to claim 39, wherein the average power density is equivalent to less than 1 W in a volume of 470 $cm^3$.*

*43. A method according to claim 39, in which the sequence is such that power is on for 20 μs and off for from 10,000 μs to 20,000 μs.*

*44. A hydrophobic and oleophobic substrate which comprises a polymer coated surface obtained by the method of claim 39.*

*45. A substrate according to claim 44, which is a fabric.*

* * * * *